(12) United States Patent
Horsnell et al.

(10) Patent No.: US 11,481,290 B2
(45) Date of Patent: Oct. 25, 2022

(54) EXCEPTION HANDLING IN TRANSACTIONS

(71) Applicant: Arm Limited, Cambridge (GB)

(72) Inventors: Matthew James Horsnell, Cambridge (GB); Grigorios Magklis, Cambridge (GB); Stephan Diestelhorst, Cambridge (GB)

(73) Assignee: Arm Limited, Cambridge (GB)

( * ) Notice: Subject to any disclaimer, the term of this patent is extended or adjusted under 35 U.S.C. 154(b) by 23 days.

(21) Appl. No.: 17/046,396

(22) PCT Filed: Apr. 8, 2019

(86) PCT No.: PCT/GB2019/051020
§ 371 (c)(1),
(2) Date: Oct. 9, 2020

(87) PCT Pub. No.: WO2019/197811
PCT Pub. Date: Oct. 17, 2019

(65) Prior Publication Data
US 2021/0103503 A1 Apr. 8, 2021

(30) Foreign Application Priority Data
Apr. 11, 2018 (GR) ............................. 20180100155

(51) Int. Cl.
*G06F 11/00* (2006.01)
*G06F 11/14* (2006.01)
(Continued)

(52) U.S. Cl.
CPC .......... *G06F 11/1474* (2013.01); *G06F 9/466* (2013.01); *G06F 11/076* (2013.01);
(Continued)

(58) Field of Classification Search
CPC ............. G06F 11/1474; G06F 11/0721; G06F 11/076; G06F 11/0772
See application file for complete search history.

(56) References Cited

U.S. PATENT DOCUMENTS

2008/0065862 A1* 3/2008 Hansen ............... G06F 9/30109
712/E9.034
2011/0161639 A1 6/2011 Knauth et al.
(Continued)

OTHER PUBLICATIONS

International Search Report and Written Opinion of the ISA for PCT/GB2019/051020 dated Jun. 4, 2019, 13 pages.
(Continued)

*Primary Examiner* — Amine Riad
(74) *Attorney, Agent, or Firm* — Nixon & Vanderhye P.C.

(57) ABSTRACT

An apparatus and a method of operating a data processing apparatus, and simulators thereof, are disclosed. Data processing circuitry performs data processing operations in response to instructions, where some sets of instructions may be defined as a transaction which are to be performed atomically with respect to other operations performed by the data processing circuitry. When a synchronous exception occurs during a transaction the transaction is aborted and an exception counter is incremented. When the counter reaches a threshold value a transaction failure signal is generated, allowing, if appropriate a response to this number of exceptions causing transaction aborts to be carried out.

11 Claims, 6 Drawing Sheets

(51) Int. Cl.
 *G06F 9/46* (2006.01)
 *G06F 11/07* (2006.01)
(52) U.S. Cl.
 CPC ...... *G06F 11/0721* (2013.01); *G06F 2201/81* (2013.01); *G06F 2201/87* (2013.01); *G06F 2201/88* (2013.01)

(56) References Cited

U.S. PATENT DOCUMENTS

| | | | | |
|---|---|---|---|---|
| 2013/0339684 A1* | 12/2013 | Alexander | .......... | G06F 9/30087 712/E9.028 |
| 2013/0339703 A1* | 12/2013 | Alexander | ................ | G06F 9/52 712/244 |
| 2015/0189426 A1* | 7/2015 | Pang | ................ | H04M 1/72412 381/77 |
| 2015/0212906 A1* | 7/2015 | Gschwind | ........... | G06F 11/1474 714/15 |
| 2015/0242278 A1* | 8/2015 | Cain, III | ................ | G06F 12/02 714/15 |

OTHER PUBLICATIONS

Robert Bedichek, "Some Efficient Architecture Simulation Techniques," Proceedings of the Winter 1990 USENIX Conference, Jan. 22-26, 1990, 12 pages.
Office Action for IN Application No. 202047047932 dated Aug. 12, 2022, 8 pages.

* cited by examiner

EXCEPTION HANDLING IN TRANSACTIONS

This application is the U.S. national phase of International Application No. PCT/GB2019/051020 filed Apr. 8, 2019 which designated the U.S. and claims priority to GR Patent Application No. 20180100155 filed Apr. 11, 2018, the entire contents of each of which are hereby incorporated by reference.

TECHNICAL FIELD

The present disclosure relates to data processing. More particularly it relates to the handling of exceptions.

BACKGROUND

A data processing apparatus which performs data processing operations in response to instructions may be capable of performing the data processing operations associated with one or more instructions as a "transaction", such that the instruction or those instructions are performed atomically with respect to other operations carried out by the apparatus. That is to say they are performed as a whole and completely, or not at all, so that no "half way carried out" status is ever perceivable to the rest of the system. Such a transaction for example may be defined by a transaction initiating instruction preceding the transactional set of instructions and concluded by a transaction ending instruction. A data processing apparatus may also be arranged to respond to a synchronous exception (i.e. one resulting from instruction execution) by carrying out a predefined exception response. One consequence of the occurrence of an exception in the context of an apparatus which can handle the above mentioned transactional instruction execution is that when a transaction is currently in progress the transaction is aborted, this typically being handled at the hardware level such that the operating system is not aware that a synchronous exception has caused a transaction abort.

SUMMARY

In at least one example embodiment there is an apparatus comprising: data processing circuitry to perform data processing operations in response to data processing instructions, wherein the data processing circuitry comprises transactional support circuitry responsive to a sequence of instructions defining a transaction to cause a transactional set of data processing operations defined by the sequence of instructions to be performed atomically with respect to other data processing operations performed by the data processing circuitry; and exception handling circuitry responsive to occurrence of a synchronous exception during performance of the sequence of instructions defining the transaction to cause the transactional support circuitry to abort the transaction such that the transactional set of data processing operations are not carried out, wherein the exception handling circuitry comprises exception counting circuitry responsive to the occurrence of the synchronous exception during performance of the sequence of instructions defining the transaction to increment a count held by the counting circuitry and the exception handling circuitry is responsive to the count reaching a threshold value to generate a transaction failure signal.

In at least one example embodiment there is a method of operating a data processing apparatus comprising the steps of: performing data processing operations in response to data processing instructions; in response to a sequence of instructions defining a transaction, causing a transactional set of data processing operations defined by the sequence of instructions to be performed atomically with respect to other data processing operations; in response to occurrence of a synchronous exception during performance of the sequence of instructions defining the transaction, aborting the transaction such that the transactional set of data processing operations are not carried out; in response to the occurrence of the synchronous exception during performance of the sequence of instructions defining the transaction, incrementing a count; and in response to the count reaching a threshold value, generating a transaction failure signal.

In at least one example embodiment there is a computer program for controlling a host data processing apparatus to provide an instruction execution environment for execution of instructions of target program code, comprising:

data processing logic to perform data processing operations in response to data processing instructions, wherein the data processing logic comprises transactional support logic responsive to a sequence of instructions defining a transaction to cause a transactional set of data processing operations defined by the sequence of instructions to be performed atomically with respect to other data processing operations performed by the data processing logic; and exception handling logic responsive to occurrence of a synchronous exception during performance of the sequence of instructions defining the transaction to cause the transactional support logic to abort the transaction such that the transactional set of data processing operations are not carried out, wherein the exception handling logic comprises exception counting logic responsive to the occurrence of the synchronous exception during performance of the sequence of instructions defining the transaction to increment a count held by the counting logic and the exception handling logic is responsive to the count reaching a threshold value to generate a transaction failure signal.

A storage medium may store the computer program described above. The storage medium may be a non-transitory storage medium.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

Figure 1:
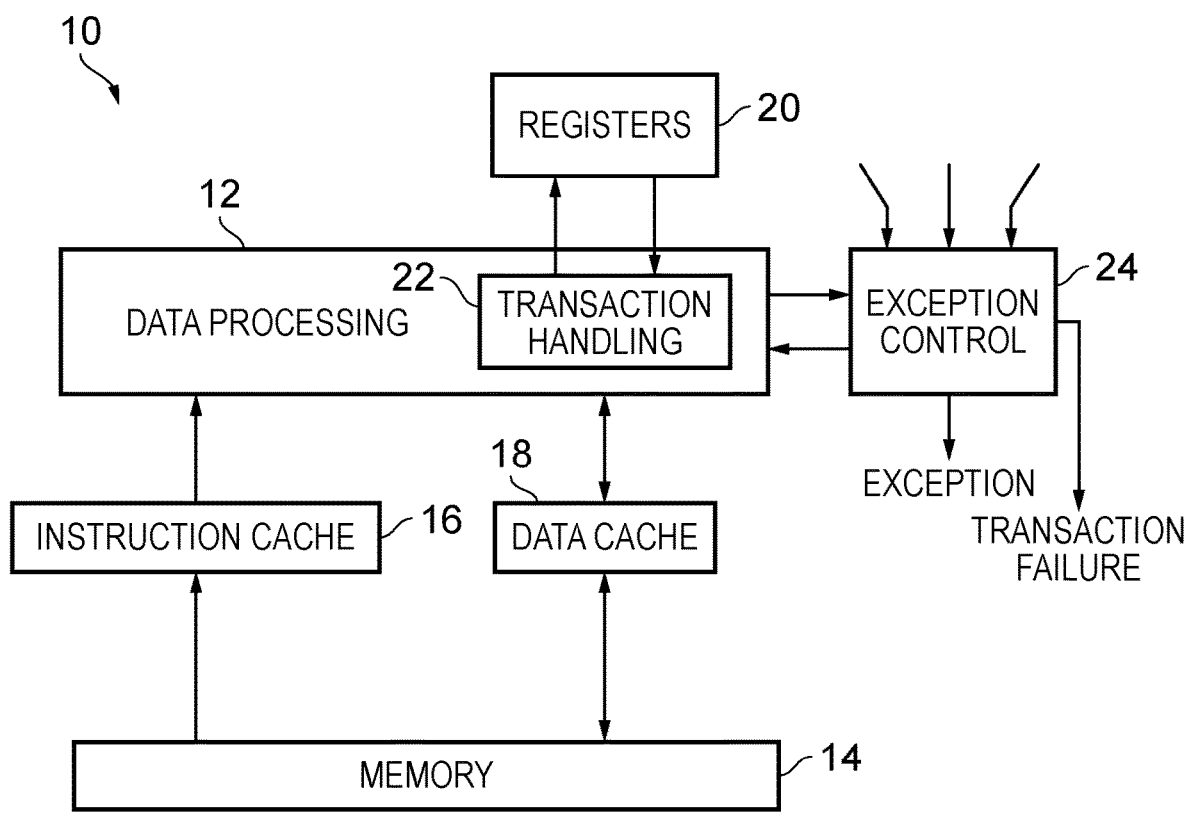
FIG. 1 schematically illustrates an apparatus in one example embodiment.

At least some embodiments provide an apparatus comprising: data processing circuitry to perform data processing operations in response to data processing instructions, wherein the data processing circuitry comprises transactional support circuitry responsive to a sequence of instructions defining a transaction to cause a transactional set of data processing operations defined by the sequence of instructions to be performed atomically with respect to other data processing operations performed by the data processing circuitry; and exception handling circuitry responsive to occurrence of a synchronous exception during performance of the sequence of instructions defining the transaction to cause the transactional support circuitry to abort the transaction such that the transactional set of data processing operations are not carried out, wherein the exception handling circuitry comprises exception counting circuitry responsive to the occurrence of the synchronous exception during performance of the sequence of instructions defining the transaction to increment a count held by the counting circuitry and the exception handling circuitry is responsive to the count reaching a threshold value to generate a transaction failure signal.

In an apparatus which performs data processing operations in response to data processing instructions and supports "transactions" according to which a transactional set of data processing instructions is performed atomically with respect to other data processing operations, one approach to the occurrence of an exception is that the synchronous exception is suppressed (i.e. the usual exception handling routine which would have otherwise have been called is not called) and the transaction simply fails and restores state to a pre-transaction state. As a result the operating system is unaware that the exception has occurred and that the transaction has failed. Whilst this has generally been seen as beneficial, since this avoids disturbing the operating system when a synchronous exception occurs and a transaction fails, which could otherwise be relatively frequent and therefore relatively disruptive, the present techniques recognise that there may be contexts in which it is preferable if the fact that a synchronous exception has occurred and a transaction has failed as a result should be notified in some way. Accordingly the present techniques propose an approach in which exception handling circuitry is provided which, whilst causing a transaction to be aborted if interrupted by a synchronous exception, nevertheless keeps a count of such occurrences (i.e. synchronous exceptions during transactions) and if this count reaches a threshold value generates a transaction failure signal. This transaction failure signal may be used in a variety of ways, but in particular may notify the operating system that the threshold number of exceptions in transactions has occurred and, for example, if the operating system determines that this could be indicative of nefarious activity (by malicious software) then mitigation steps to defend against that activity can be put in place. For example, the present techniques recognise that a user-space programme can attempt nefarious memory access patterns within a transaction without the operating system being aware. The present techniques address this. Accordingly privileged code can (occasionally) observe synchronous exception activity, depending on the choice of threshold value set for the counter. Within the context of privilege levels within a data processing apparatus, the definition of the threshold value can be set by a privileged level and synchronous exceptions are elided (i.e. suppressed) up to this defined numeric limit, before the occurrence of these exceptions is then raised from the user level to the privileged level.

The threshold value may be predefined for the apparatus or in some embodiments may be a programmable value held by the exception counting circuitry. This allows flexibility in the configuration of the apparatus, depending on the context in which it is carrying out its data processing operations. As a security measure it is proposed that the programmable value is only settable by a privileged level within the apparatus, such that a non privileged level (e.g. user level) cannot modify it.

The exception counting circuitry may count all exceptions, for example counting all exception with a single counter, but in some embodiments the exception counting circuitry is responsive to the occurrence of the synchronous exception during performance of the sequence of instructions defining the transaction to increment the count held by the counting circuitry in dependence on a type of the synchronous exception. For example the exception counting circuitry may be arranged to only increment the count (and therefore ultimately generate the transaction failure signal) for a certain type (or types) of exception, if it is determined that this type (or types) of exception are worth generating the transaction failure for, where others continue to be fully suppressed without any potential transaction failure signal.

Indeed the exception counting circuitry may be arranged to ignore certain exception types and hence in some embodiments the exception counting circuitry comprises an exception type mask configured to filter by exception type incoming signals indicative of occurrence of synchronous exceptions. This exception type mask, which itself may be programmable, can therefore be used to configure the manner in which the exception counting circuitry counts types of exceptions which occur within transactions.

The exception counting circuitry may (as mentioned above) comprise only a single counter which is used to count occurrences of one or more types of exceptions which occurred during transactions, but in some embodiments the exception counting circuitry comprises plural counters and the exception counting circuitry is arranged to increment a selected counter of the plural counters in dependence on the type of the synchronous exception. Accordingly, the exception counting circuitry can therefore maintain individual counts for different types (or sets of types) of synchronous exceptions occurring during transactions.

The transaction failure signal may simply indicate that a number of transaction failures as a result of synchronous exceptions has now reached the threshold value without distinguishing between types of synchronous exception, but in some embodiments the exception handling circuitry is responsive to the count reaching the threshold value to generate a transaction failure exception type signal indicative of the type of the synchronous exception which caused the count to reach the threshold value. Accordingly, where the exception handling circuitry may differentiate between different types of synchronous exceptions, it may then also generate a transaction failure exception type signal which provides the recipient with information about the type of synchronous exception which has caused a count to reach a threshold value. This may for example provide the operating system with a clearer view of what type of nefarious activity may be in progress.

Further, additional information may be provided in association with the transaction failure signal and the transaction failure exception type signal which in some embodiments takes the form of a transaction failure exception profile. In such embodiments the exception handling circuitry is responsive to the count reaching the threshold value to output a transaction failure exception profile indicative of at least one of: a number of exceptions, a number of exception types, and a number of exceptions of each of a set of exception types, which caused the count to reach the threshold value. In other words further information may be output from the exception handling circuitry to allow the recipient a more detailed understanding of what caused the count or counters to reach the threshold value (or values). As mentioned above one reason for suppressing notification of transaction failure in response to an exception is to avoid over-burdening the recipient with this information (e.g. notifying the operating system too frequently) and accordingly in some embodiments the exception counting circuitry comprises timing circuitry to measure a predetermined time period and the counting circuitry is responsive to the timing circuitry indicating elapse of the predetermined time period to reset the count held by the counting circuitry. This approach recognises that beyond a counter reaching its threshold value it may be of use to the recipient to know that this count has reached the threshold value within a predetermined time period and the timing circuitry allows this to happen, resetting at a predetermined time interval, such that only counts reaching a threshold within this period will be notified to the recipient of the transaction failure signal.

Generally the abortion of a transaction may mean that to other components of the apparatus all that is known is that the transaction has failed, without knowing precisely what caused the failure within the transaction, since it is a feature of transactions that when they fail the state is rolled back to what it was before the transaction was started, and the present techniques recognise that further information relating to the cause of the transaction failure as a result of the synchronous exception may be beneficial. Accordingly in some embodiments the exception handling circuitry comprises exception program counter storage to store a program counter value associated with the occurrence of the synchronous exception during performance of the sequence of instructions defining the transaction, and the exception handling circuitry is responsive to the count reaching the threshold value to output the program counter value. The recipient can then make use of the program counter value to more specifically identify the source of the synchronous exception and hence the transaction failure.

At least some embodiments provide a method of operating a data processing apparatus comprising the steps of: performing data processing operations in response to data processing instructions; in response to a sequence of instructions defining a transaction, causing a transactional set of data processing operations defined by the sequence of instructions to be performed atomically with respect to other data processing operations; in response to occurrence of a synchronous exception during performance of the sequence of instructions defining the transaction, aborting the transaction such that the transactional set of data processing operations are not carried out; in response to the occurrence of the synchronous exception during performance of the sequence of instructions defining the transaction, incrementing a count; and in response to the count reaching a threshold value, generating a transaction failure signal.

At least some embodiments provide a computer program for controlling a host data processing apparatus to provide an instruction execution environment for execution of instructions of target program code, comprising:

data processing logic to perform data processing operations in response to data processing instructions, wherein the data processing logic comprises transactional support logic responsive to a sequence of instructions defining a transaction to cause a transactional set of data processing operations defined by the sequence of instructions to be performed atomically with respect to other data processing operations performed by the data processing logic; and exception handling logic responsive to occurrence of a synchronous exception during performance of the sequence of instructions defining the transaction to cause the transactional support logic to abort the transaction such that the transactional set of data processing operations are not carried out, wherein the exception handling logic comprises exception counting logic responsive to the occurrence of the synchronous exception during performance of the sequence of instructions defining the transaction to increment a count held by the counting logic and the exception handling logic is responsive to the count reaching a threshold value to generate a transaction failure signal.

At least some embodiments provide a storage medium may store the computer program described above. The storage medium may be a non-transitory storage medium.

Some particular embodiments are now described with reference to the figures.

FIG. 1 schematically illustrates an apparatus 10 in one example embodiment. The apparatus 10 comprises data processing circuitry 12, which may for example be in the form of a sequence of pipelined stages (leading from left to right in the figure). The data processing circuitry 12 performs data processing operation in response to instructions which are retrieved from memory 14 and temporarily cached in the instruction cache 16. The data processing operations may cause retrieval of data items from memory 14 which are temporarily cached in the data cache 18. Data processing operations which the data processing circuitry 12 carries out may make reference to and modify values held in the registers 20. The data processing circuitry 12 is shown to comprise transaction handling circuitry 22 which enables the data processing circuitry to support transactional operations according to which a transaction, defined by an identified set of instructions (e.g. beginning with a "transaction start" instruction and ending with a "transaction end" instruction) are performed atomically with respect to other data processing operations. Where the transaction is to be performed atomically, if it fails the state needs to be rolled back to the beginning of the transaction and a snapshot of the content of relevant registers in the set of registers 20 is used for this purpose, so that if a transaction is aborted the register snapshot created at the start of the transaction is used to "unwind" any modifications to those registers performed in the attempted transaction. The apparatus 10 further comprises exception control circuitry 24 which receives signals relating to various operations taking place within the apparatus 10 and can generate an exception signal in response, which in general will typically cause a predetermined exception handling routine to be carried out. Additionally the exception control circuitry 24 receives signals from the transaction handling circuitry indicating when a transaction is in process and this modifies the behaviour of the exception control circuitry 24 as will be described in more detail below with reference to the following figures, but in particular the exception control circuitry 24 may, rather than causing an exception handling routine to be carried out in response to an exception, suppress that exception if it occurs during a transaction, and the transaction is aborted. Further if a count of the number times that this has happened has now reached a threshold, it causes a transaction failure signal to be generated.

Figure 2:
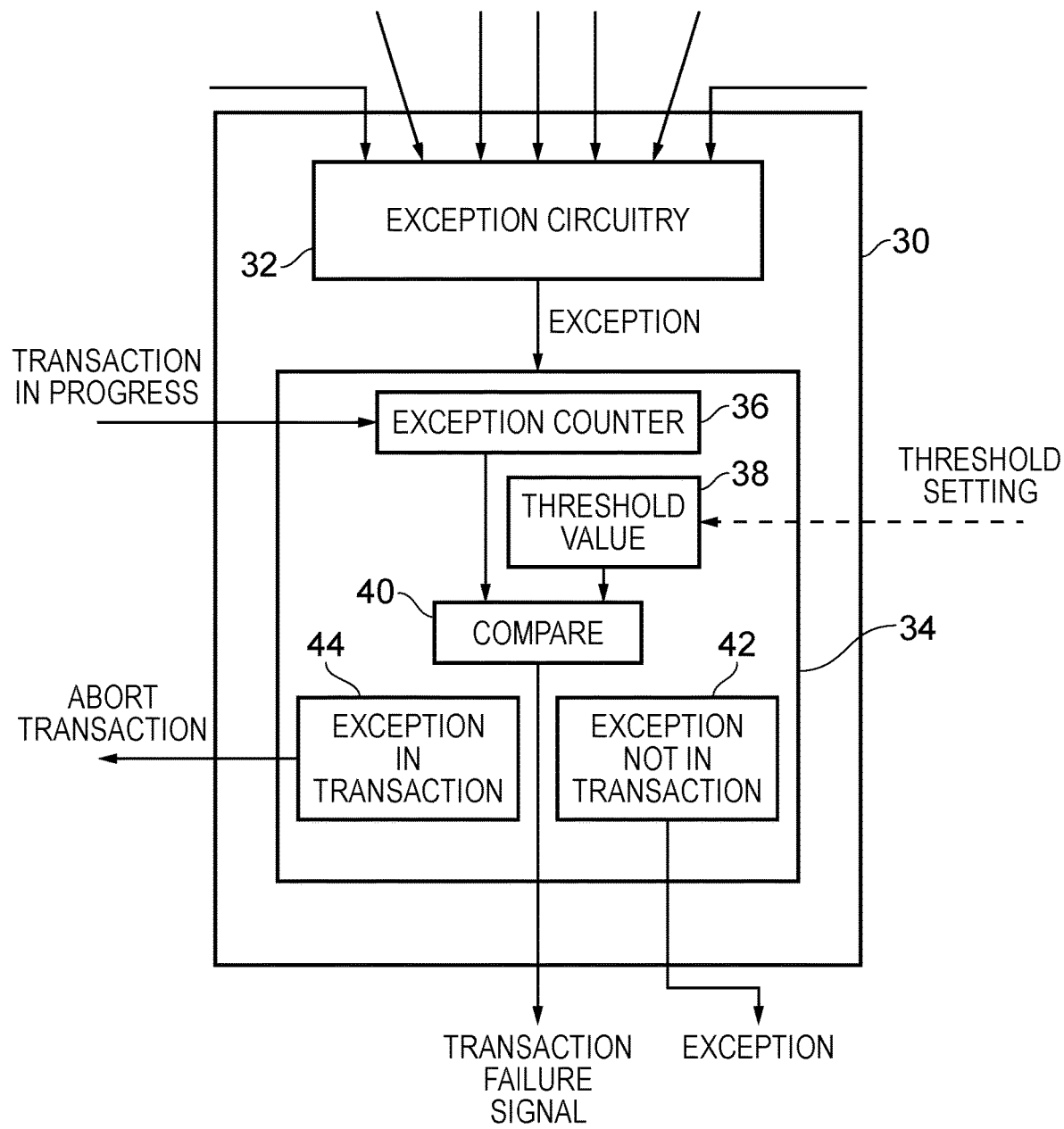
FIG. 2 schematically illustrates exception handling circuitry in one example embodiment.

FIG. 2 schematically illustrates exception handling circuitry 30 in one example embodiment. The exception handling circuitry 30 is shown to comprise exception circuitry 32 and exception counting circuitry 34. The exception circuitry 32, which receives the multiple signals from various components of the apparatus and in response to those signals may generate an exception, can be considered to perform in a manner with which the skilled person is familiar for the generation of exceptions in a data processing apparatus. However, the exception counting circuitry 34 proposed by the present techniques may be considered as a variety of filter on the exception signal, in that under certain circumstances the exception signal may be transmitted unaffected from the exception counting circuitry 36 and hence from the exception handling circuitry 30, but under other circumstances instead a transaction failure signal may be generated. For this purpose the exception counting circuitry comprises an exception counter 36, a threshold value storage 38, comparison circuitry 40 and circuitry 42 to determine when an exception has been received when a transaction was not in progress. The exception handling circuitry 30 receives a signal indicating when a transaction is in progress (i.e. for example from the transaction handling circuitry 22 shown in the example of FIG. 1). This is in particular received by the exception counter 36 which is arranged to only increment if an exception is generated by the exception circuitry 32 whilst a transaction is in progress. The value indicated by the exception counter 36 is compared by comparison circuitry 40 with a stored threshold value 38. The threshold value may be programmable (by an agent in the system which has a suitable level of privilege, for example by privileged level code), this variant being indicated by the dashed line in FIG. 2. When the comparison circuitry 40 determines that the exception counter has reached the threshold value the transaction failure signal is generated. This may for example be received by an agent at the privileged level (e.g. at the operating system level, to respond, for example in a defensive manner, if deemed appropriate). Otherwise, if an exception has been received whilst a transaction is in progress, but the exception counter has not yet reached a threshold value, then the exception is simply suppressed and the transaction is caused to be aborted by signal being generated by the exception in transaction circuitry 44. However, conversely if an exception is received while a transaction is not in progress then circuitry 44 configured to identify this causes the exception signal to be generated (i.e. in effect this exception signal passes unaffected through the exception counting circuitry 34). An exception handling routine defined for this exception may be carried out as a result.

Figure 3:
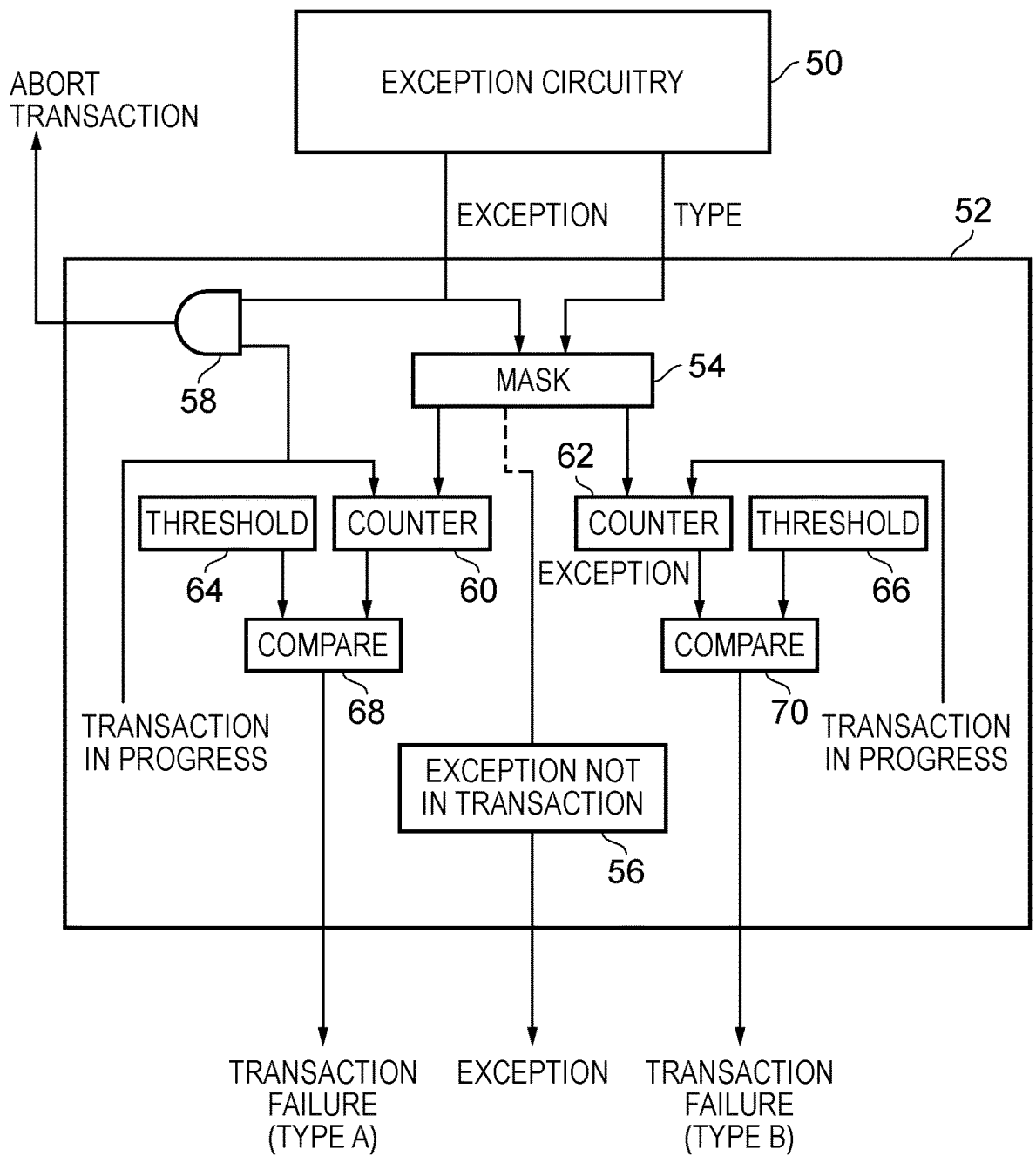
FIG. 3 schematically illustrates exception handling circuitry in one example embodiment.

FIG. 3 schematically illustrates exception handling circuitry in one example embodiment. Exception circuitry 50 receives signals from various system components as mentioned above, and may generate an exception signal in response thereto. In addition, however as is shown in the example of FIG. 3, it may further generate an indication of the type of exception. The exception signal and the indication of the type of exception are received by exception processing circuitry 52 within the exception processing circuitry 52. The exception signal and the exception type signal are received by a mask 54, which itself may be programmable, and thus acts as a filter on the exception signals received. Note however, that the dashed line in the figure leading from the mask 54 indicates that the exception signal is also passed unmasked directly bypassing the mask 54 to circuitry 56 which can identify when an exception has been received when a transaction is not in progress, and therefore passes the exception signal "unfiltered" through the exception processing circuitry 52. The exception signal is also received by the AND logic 58, which as its other input receives the transaction in progress signal. As a result, when an exception is received whilst a transaction is in progress, the abort transaction signal is generated. The masked exception signals, in dependence on the type of exception signal are passed to one of two counters 60, 62 which maintain respective counts for different types of exceptions. These counters may maintain counts only for one specific type of exception or either or both of the counters may collate exception counts for more than one type of exception. Further, more than two counters may be provided in other example embodiments, but only two are illustrated in FIG. 3 for simplicity. Each counter has an associated threshold value 64, 66 and when associated comparison circuitry 68, 70 determines that the respective counter has reached its respective threshold value then a transaction failure signal, indicating the type, is generated. In the example of FIG. 3 two types of transaction failure signal can be generated. The number of transaction failure signals which may be generated naturally depends on the number of counters which are provided. Note that the counters receive the transaction in progress signal such that the counters are only implemented if an exception of the relevant type is received whilst a transaction is in progress.

Figure 4:
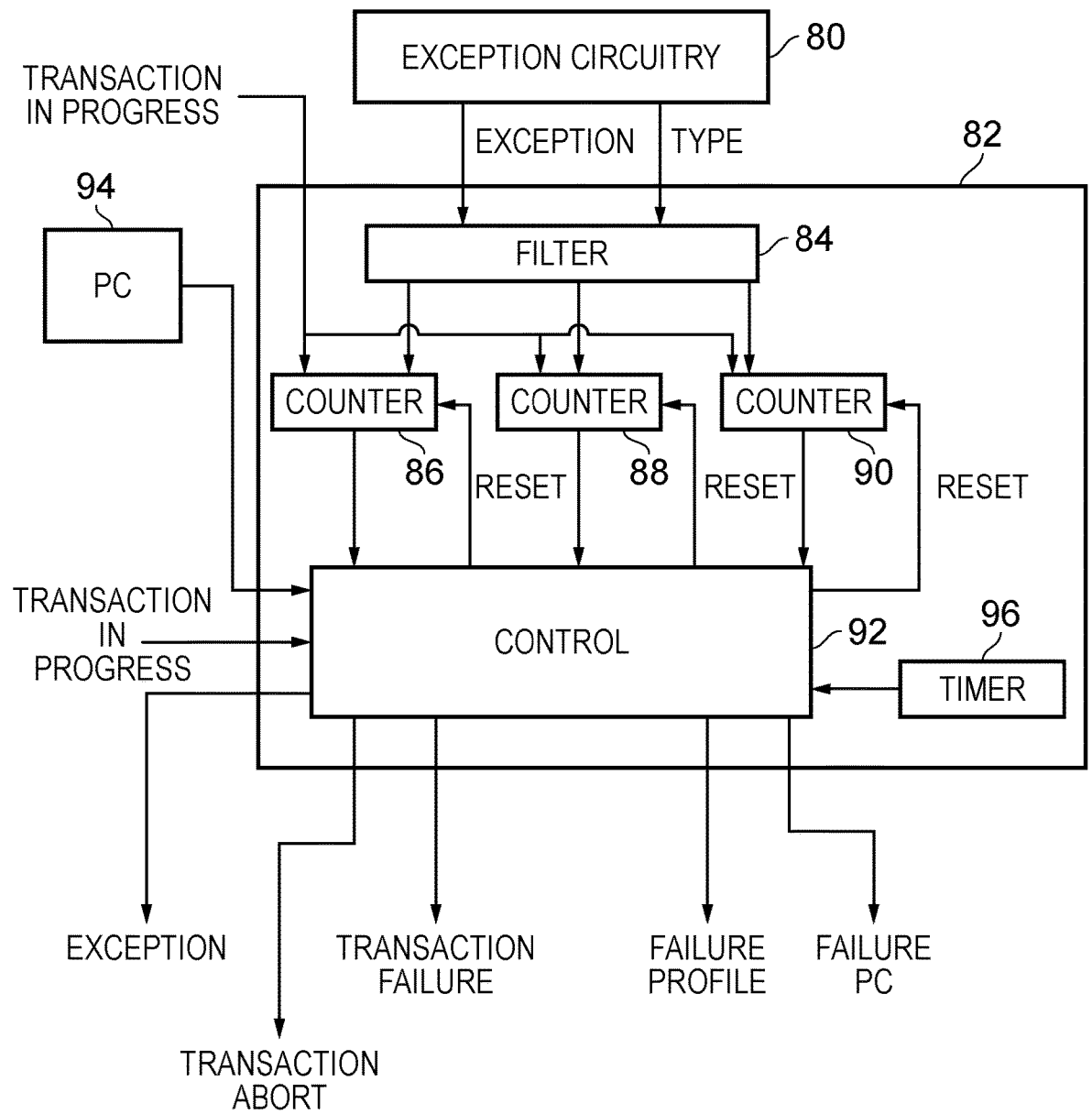
FIG. 4 schematically illustrates exception handling circuitry in one example embodiment.

FIG. 4 schematically illustrates exception handling circuitry in one example embodiment. Exception circuitry 80, in the same manner as the exception circuitry 50 of FIG. 3, receives various signals from various components of the apparatus and as a result may generate an exception signal and an indication of the type of exception. These are received by exception processing circuitry 82 and in particular by a filter 84 provided therein, which, in the manner of the mask 54 of FIG. 3, may be configured to filter out certain exceptions or types of exceptions and further passes an indication of received exception signals of the relevant type to one of the counters 86, 88, 90. The values held by each of these respective counters is received by the control circuitry 92 which provides a variety of control functions for the exception processing circuitry 82 and maintains a defined threshold value for each of the counters. When one of the counters reaches its threshold value the control circuitry 92 can generate the transaction failure signal. In addition, regardless of whether a counter has reached its threshold value, the control circuitry 92 generates the transaction abort signal when any exception is received from the exception circuitry 80 whilst a transaction is in progress. Conversely, when an exception is received when a transaction is not in progress (the control signal receiving the transaction in progress signal from the transaction handling circuitry of the apparatus) the control signal generates an exception signal (i.e. effectively the exception signal generated by the exception circuitry 80 passes unamended through the exception processing circuitry 82). In addition to generating a transaction failure signal when one of the counters reaches its threshold value, the control circuitry 92 also generates a failure profile signal which provides additional information relating to the transaction failure. This may for example be a snapshot of the current values of each of the counters 86, 88, 90, it may indicate a number of certain types of exceptions which have been received, and in particular may indicate a number of a certain type of exceptions which have caused the given counter to reach its threshold value. In addition the control circuitry 92 receives an indication of a current PC value 94 such that in the situation when the transaction failure signal is generated and the associated failure profile is generated, the control circuitry 92 alternatively, or in addition, can output an indication of the current PC value 94 such that the recipient of the transaction failure signal can know which instruction within the transaction caused the synchronous exception which caused the relevant counter to reach its threshold value. Otherwise, where the transaction is simply aborted, the recipient of the transaction failure signal might not have any indication of which instruction within the set of instructions defining the transaction set caused the synchronous exception and hence the transaction abort. Finally, the exception processing circuitry 82 also comprises a timer 96 which is arranged to send a signal to the control circuitry 92 at predetermined time intervals. In response to receipt of this timing signal, the control circuitry 92 causes each of the counters 86, 88, 90 to reset such that it is only when the threshold number of exceptions are received within that predetermined time period, that the transaction failure signal and so on may be generated. This means that the recipient of the transaction failure signal will not be too frequently disturbed by the transaction failure signal if it is determined that exceptions causing transaction abort are acceptable if they occur below a certain frequency. Generally it should be noted that the various subcomponents of the exception handling circuitry embodiments shown in FIGS. 2, 3 and 4 are not to be considered to be exclusively provided within those embodiments and various combinations of these features may be made in other example embodiments within the scope of the present techniques. Conversely the combination of components shown in each of FIGS. 2, 3, and 4 individually should not be considered to be necessarily provided in association with one another, for example where FIG. 2 shows an embodiment with only one exception counter and FIG. 4 shows an example with multiple exception counters and with further optional features such as the program counter and the reset timer it should not be concluded that the program counter and the reset timer may only be provided in embodiments with multiple counters and these could each or both be provided in an embodiment with only a single counter. The same applies to any subcomponents within the example embodiments of FIGS. 2, 3, and 4 which are not otherwise described as mutually interacting in an essential manner.

Figure 5:
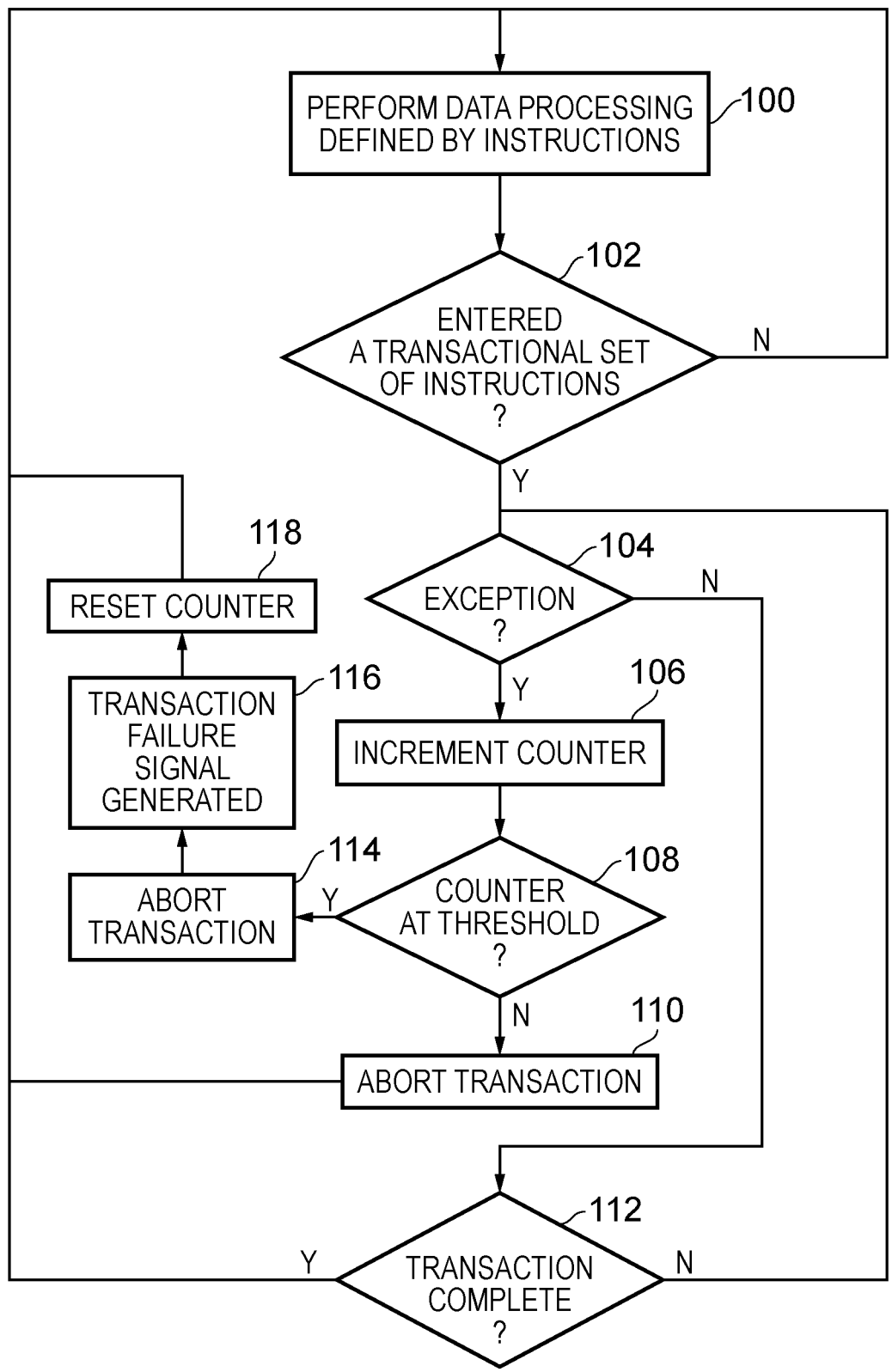
FIG. 5 is a flow diagram showing a method of exception handling in one example embodiment.

FIG. 5 shows a sequence of steps which are taken in the method of one example embodiment. The flow can be considered to begin at step 100 where data processing is performed defined by instructions. Then at step 102 it is determined if the instruction execution has entered a transactional set of instructions, e.g. by means of a "transaction start" instruction. If it has not then the flow returns to step 100 since the method described relates only to processes occurring when a transaction is in progress. If a transaction is in progress then from step 102 the flow proceeds to step 104 where it is determined if an exception has been generated. If it has not then the flow proceeds to step 112, where it is determined if the transaction is now complete, e.g. by means of a "transaction end" instruction. If the transaction has now ended then the flow returns to step 100. However if the transaction is still in progress then the flow returns to step 104. Further, if at step 104 it is determined that an exception has been received then at step 106 the exception counter is incremented and step 108 it is determined if the counter is now at its threshold value. If it is not then the flow proceeds to step 110 where the transaction is aborted and the flow returns to step 100. If however, at step 108 the counter is found to now be at its threshold value then firstly at step 114 the transaction is aborted and then at step 116 the transaction failure signal is generated. Finally at step 118 the exception counter is reset and the flow returns to step 100.

Figure 6:
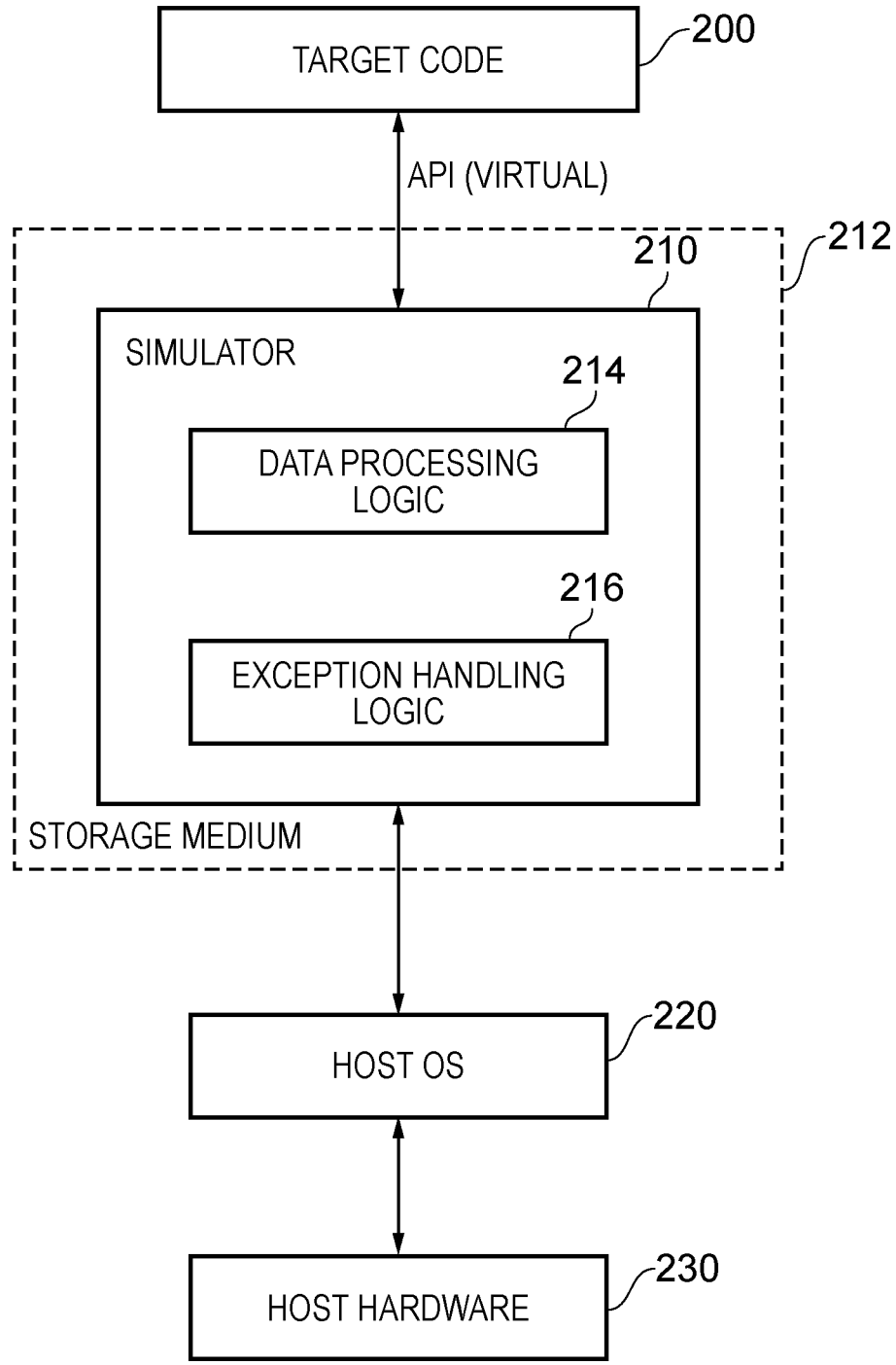
FIG. 6 shows an example of a simulator supporting data processing logic and exception handling logic.

FIG. 6 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium 212 (which may be a non-transitory medium), and provides a program interface (instruction execution environment) to the target code 200 (which may include applications, operating systems and a hypervisor) which is the same as the application program interface of the hardware architecture being modelled by the simulator program 210. Thus, the program instructions of the target code 200 may be executed from within the instruction execution environment using the simulator program 210, so that a host computer 230 which does not actually have the hardware features of the apparatus 60 discussed above can emulate these features. For example, the simulator program 210 may include data processing logic 214 and exception handling logic 216 to simulate the behaviour of any of the data processing circuitry and exception handling circuitry as described above. Thus the simulator program 210 may also include transactional support logic responsive to a sequence of instructions defining a transaction to cause a transactional set of data processing operations defined by the sequence of instructions to be performed atomically with respect to other data processing operations performed by the data processing logic.

In brief overall summary an apparatus and a method of operating a data processing apparatus, and simulators thereof, are disclosed. Data processing circuitry performs data processing operations in response to instructions, where some sets of instructions may be defined as a transaction which are to be performed atomically with respect to other operations performed by the data processing circuitry. When a synchronous exception occurs during a transaction, the transaction is aborted and an exception counter is incremented. When the counter reaches a threshold value a transaction failure signal is generated, allowing if appropriate a response to this number of exceptions causing transaction aborts to be carried out.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. An apparatus comprising:
    data processing circuitry to perform data processing operations in response to data processing instructions, wherein the data processing circuitry comprises transactional support circuitry responsive to a sequence of instructions defining a transaction to cause a transactional set of data processing operations defined by the sequence of instructions to be performed atomically with respect to other data processing operations performed by the data processing circuitry; and
    exception handling circuitry responsive to occurrence of a synchronous exception during performance of the sequence of instructions defining the transaction to cause the transactional support circuitry to abort the transaction such that the transactional set of data processing operations are not carried out,
    wherein the exception handling circuitry comprises exception counting circuitry responsive to the occurrence of the synchronous exception during performance of the sequence of instructions defining the transaction to increment a count held by the counting circuitry and the exception handling circuitry is responsive to the count reaching a threshold value to generate a transaction failure signal.

2. The apparatus of claim 1, wherein the threshold value is a programmable value held by the exception counting circuitry.

3. The apparatus of claim 1, wherein the exception counting circuitry is responsive to the occurrence of the synchronous exception during performance of the sequence of instructions defining the transaction to increment the count held by the counting circuitry in dependence on a type of the synchronous exception.

4. The apparatus of claim 3, wherein the exception counting circuitry comprises an exception type mask configured to filter by exception type incoming signals indicative of occurrence of synchronous exceptions.

5. The apparatus of claim 3, wherein the exception counting circuitry comprises plural counters and the exception counting circuitry is arranged to increment a selected counter of the plural counters in dependence on the type of the synchronous exception.

6. The apparatus of claim 3, wherein the exception handling circuitry is responsive to the count reaching the threshold value to generate a transaction failure exception type signal indicative of the type of the synchronous exception which caused the count to reach the threshold value.

7. The apparatus of claim 3, wherein the exception handling circuitry is responsive to the count reaching the threshold value to output a transaction failure exception profile indicative of at least one of:
    a number of exceptions,
    a number of exception types, and
    a number of exceptions of each of a set of exception types,
        which caused the count to reach the threshold value.

8. The apparatus of claim 1, wherein the exception counting circuitry comprises timing circuitry to measure a predetermined time period and the counting circuitry is responsive to the timing circuitry indicating elapse of the predetermined time period to reset the count held by the counting circuitry.

9. The apparatus of claim 1, wherein the exception handling circuitry comprises exception program counter storage to store a program counter value associated with the occurrence of the synchronous exception during performance of the sequence of instructions defining the transaction, and the exception handling circuitry is responsive to the count reaching the threshold value to output the program counter value.

10. A method of operating a data processing apparatus comprising the steps of:
    performing data processing operations in response to data processing instructions;
    in response to a sequence of instructions defining a transaction, causing a transactional set of data processing operations defined by the sequence of instructions to be performed atomically with respect to other data processing operations;
    in response to occurrence of a synchronous exception during performance of the sequence of instructions defining the transaction, aborting the transaction such that the transactional set of data processing operations are not carried out;
    in response to the occurrence of the synchronous exception during performance of the sequence of instructions defining the transaction, incrementing a count; and
    in response to the count reaching a threshold value, generating a transaction failure signal.

11. A non-transitory, computer-readable storage medium storing a computer program for controlling a host data processing apparatus to provide an instruction execution environment for execution of instructions of target program code, comprising:
    data processing logic to perform data processing operations in response to data processing instructions, wherein the data processing logic comprises transactional support logic responsive to a sequence of instructions defining a transaction to cause a transactional set of data processing operations defined by the sequence of instructions to be performed atomically with respect to other data processing operations performed by the data processing logic; and exception handling logic responsive to occurrence of a synchronous exception during performance of the sequence of instructions defining the transaction to cause the transactional support logic to abort the transaction such that the transactional set of data processing operations are not carried out, wherein the exception handling logic comprises exception counting logic responsive to the occurrence of the synchronous exception during performance of the sequence of instructions defining the transaction to increment a count held by the counting logic and the exception handling logic is responsive to the count reaching a threshold value to generate a transaction failure signal.

* * * * *